(12) United States Patent
Pablo Curto et al.

(10) Patent No.: US 10,839,997 B2
(45) Date of Patent: Nov. 17, 2020

(54) GAS SAFETY VALVE

(71) Applicant: ORKLI, S. COOP., Ordizia (ES)

(72) Inventors: Marcos Pablo Curto, Hernani (ES); Andoni Unanue Imaz, Idiazabal (ES)

(73) Assignee: ORKLI, S. COOP., Ordizia (ES)

( * ) Notice: Subject to any disclaimer, the term of this patent is extended or adjusted under 35 U.S.C. 154(b) by 169 days.

(21) Appl. No.: 16/267,885

(22) Filed: Feb. 5, 2019

(65) Prior Publication Data

US 2019/0242490 A1   Aug. 8, 2019

(30) Foreign Application Priority Data

Feb. 6, 2018 (EP) ..................................... 18155227

(51) Int. Cl.
| | |
|---|---|
| F16K 31/06 | (2006.01) |
| H01F 5/04 | (2006.01) |
| H01F 7/06 | (2006.01) |
| F23N 5/10 | (2006.01) |
| F23N 1/00 | (2006.01) |

(Continued)

(52) U.S. Cl.
CPC ........... *H01F 5/04* (2013.01); *F16K 31/0655* (2013.01); *F16K 31/0675* (2013.01); *F23N 1/005* (2013.01); *F23N 5/105* (2013.01); *H01F 7/081* (2013.01); *H01F 7/16* (2013.01); *F23N 2235/00* (2020.01); *F23N 2235/14* (2020.01); *F23N 2235/24* (2020.01); *H01F 7/1638* (2013.01); *H01F 2007/062* (2013.01)

(58) Field of Classification Search
CPC .. F16K 31/0675; F16K 31/0655; F16K 17/00; F23N 5/105; F23N 1/005; F23N 2235/00; F23N 2235/14; F23N 2235/24; H01F 7/081; H01F 7/16; H01F 2007/062; H01F 7/1638; F23K 2900/05002

See application file for complete search history.

(56) References Cited

U.S. PATENT DOCUMENTS

| | | | | |
|---|---|---|---|---|
| 5,331,730 A | * | 7/1994 | Brinn, Jr. .............. | H01F 7/1607 29/606 |
| 2009/0078901 A1 | | 3/2009 | Guirado Tristan et al. | |

FOREIGN PATENT DOCUMENTS

| | | |
|---|---|---|
| EP | 1063474 A1 | 12/2000 |
| EP | 3222914 A1 | 9/2017 |

OTHER PUBLICATIONS

Extended European Search Report in corresponding European Application No. 18155227A, dated Aug. 21, 2018, 5 pages.

* cited by examiner

*Primary Examiner* — Mohamad A Musleh
(74) *Attorney, Agent, or Firm* — Edell, Shapiro & Finnan, LLC

(57) ABSTRACT

A gas safety valve adapted to a domestic appliance is provided that includes an electromagnet, a phase wire and a ground wire. A support of the electromagnet includes a housing in which resides a phase closure. A segment of the phase wire and a segment of the ground wire are respectively electrically connected with the phase closure and with the support. According to one embodiment the valve includes a connector inserted in the housing of the support. The connector having inserted therein a first end portion of a phase terminal and a first end portion of a ground terminal that are respectively electrically connected with the phase closure and an inner area of the support. Each of the phase terminal and ground terminal including a second end portion that resides exposed to the outside of the valve.

21 Claims, 6 Drawing Sheets

(51) Int. Cl.
*H01F 7/08* (2006.01)
*H01F 7/16* (2006.01)

GAS SAFETY VALVE

CROSS-REFERENCE TO RELATED APPLICATIONS

This application relates to and claims the benefit and priority to European Application No. 18155227.4, filed Feb. 6, 2018.

TECHNICAL FIELD

The present invention relates to gas safety valve.

BACKGROUND

Gas safety valves adapted to a domestic appliance are known, said valves comprising an electromagnet with a fixed core, a support of the electromagnet, and a mobile armature coupled to the plug and movable with respect to the electromagnet between an open valve position in which the electromagnet is energized and the mobile armature is in contact with the electromagnet, and a closed valve position wherein the electromagnet is not energized.

Safety valves today are limited in terms of electrical connection systems given their constructive shapes and the reduced size of their parts which have to perform many functions. The support or seat (which is the largest metal part that is commonly made of brass or aluminum) performs functions for supporting the assembly of the remaining parts of the safety valve, as a support for anchoring the safety valve in the gas valve of which it is a part, for the internal tightness in the safety valve to prevent gas from leaking out, as a support for the system for the electrical connection and isolation of the phase and/or ground terminals.

By performing the function for the tightness and electrical connection in the lower area of the support of the gas safety valve, and given the reduced available space and the difficulty in welding electrical connections inside the support, safety valves perform the electrical connection on the outside by means of welding the phase wire and the ground wire of the coil to the corresponding terminal. Other solutions consist of performing electrical connections in the area of the core and the coil of the electromagnet of the gas safety valve, but this takes away space for the coil and it does not allow reducing the distance between terminals either.

European Publication No. EP3222914A1 discloses a gas safety valve adapted to a domestic appliance, comprising a electromagnet comprising a core, a reel inserted in the core, the reel comprising a projection extending axially and comprising a first electrical contact area, and a second electrical contact area, and a winding supported on the reel, the winding comprising a phase wire and a ground wire, a segment of the phase wire being arranged in the first electrical contact area, and a segment of the ground wire being arranged in the second electrical contact area, a support of the electromagnet being electrically conductive, and a phase closure, which is a phase connector, wherein the first electrical contact area is arranged inserted in the phase closure and the second electrical contact area is arranged inserted in the support, both electrical contact areas exerting an elastic force against the phase closure and the support, respectively, which assures the electrical connection between the phase wire and the phase closure, and between the ground wire and the support, respectively, the support comprising a housing in which the phase closure is arranged.

SUMMARY

Gas safety valves are disclosed adapted for use in a domestic appliance. According to one embodiment a gas safety valve is provided that includes an electromagnet a core, a reel inserted in the core, the reel comprising a projection extending axially and comprising a first electrical contact area, and a second electrical contact area, and a winding supported on the reel, the winding comprising a phase wire and a ground wire, a segment of the phase wire being arranged in the first electrical contact area, and a segment of the ground wire being arranged in the second electrical contact area, a support of the electromagnet being electrically conductive, and a phase closure, which is a phase connector, wherein the first electrical contact area is arranged inserted in the phase closure and the second electrical contact area is arranged inserted in the support, both electrical contact areas exerting an elastic force against the phase closure and the support, respectively, which assures the electrical connection between the phase wire and the phase closure, and between the ground wire and the support, respectively, the support comprising a housing in which the phase closure is arranged.

The gas safety valve comprises a connector comprising a base at least partially inserted in the housing of the support, said connector comprising, inserted in the base, a first end of a phase terminal and a first end of a ground terminal, the phase closure being electrically connected with the first end of the phase terminal, an inner area of the support being electrically connected with the first end of the ground terminal, and a second end of the phase terminal and a second end of the ground terminal being in contact with the outside of the gas safety valve, where the second end of the phase terminal and the second end of the ground terminal can form a standard connector.

A gas safety valve is thereby obtained in which the electrical connections of the phase wire and the ground wire of the coil of the electromagnet with the phase closure and the support of the electromagnet of the safety valve, respectively, are performed in an inner housing of the support of the electromagnet. A space which allows using electrical connections with units outside the gas safety valve by means of standard connectors existing on the market, without having to resort to special connectors, is thereby obtained. Said connectors comprise a base comprising the phase and ground terminals which is inserted in the space obtained inside the support of the electromagnet. These connectors can have a number of shapes and sizes, depending on the desired electrical connection, obtaining a more reliable and less expensive electrical connection.

These and other advantages and features will become evident in view of the drawings and the detailed disclosure.

DETAILED DESCRIPTION

Figure 1:
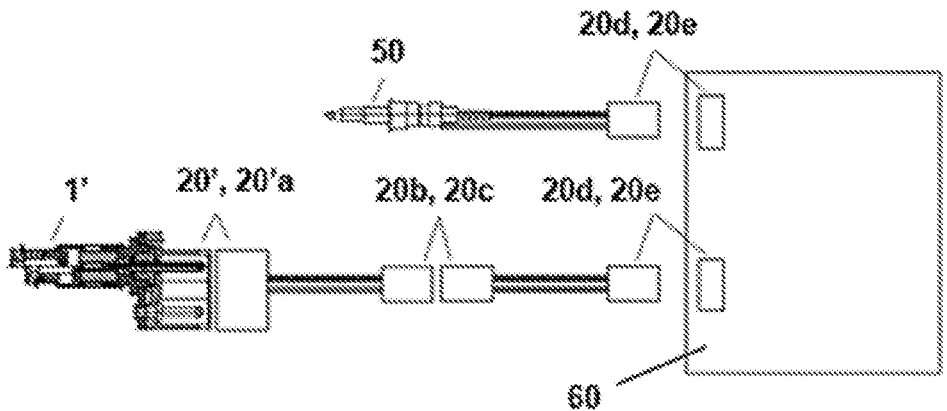
FIG. 1 shows a schematic view of an electrical connection of the prior art between a gas safety valve of the prior art and a thermocouple by means of a chip card, in which the connector of the gas safety valve and the connector from the chip card connecting with the connector of the gas safety valve are special connectors.

FIG. 1 shows a schematic view of a known electrical connection of the prior art between a known gas safety valve 1' of the prior art and a thermocouple 50 arranged in a domestic appliance to determine the temperature in an enclosure. In this embodiment, the electrical connection is performed through a chip card 60. The thermocouple 50 is connected to a standard connector 20e of the chip card 60 by means of a standard connector 20d. The output of the chip card 60 is by means of a standard connector 20e to which a cable with a standard connector 20d at one end and a standard connector 20c at the other end is connected. In turn, this standard connector 20c to which a cable with a standard connector 20b at one end, and a special connector 20a' at the other end is connected. Finally, the special connector 20a' is connected to a special output connector 20' of the gas safety valve 1'.

Figure 2:
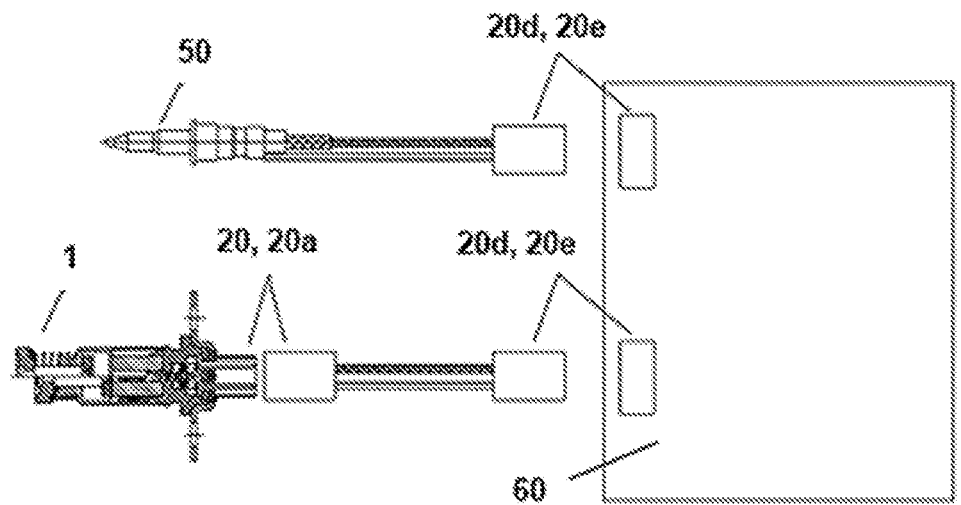
FIG. 2 shows a schematic view of an electrical connection between an embodiment of the gas safety valve according to the invention and a thermocouple by means of a chip card, in which the connector of the gas safety valve of the invention and the connector from the chip card connecting with the connector of the gas safety valve of the invention are standard connectors existing in the market.

FIG. 2 shows a schematic view of an electrical connection between an embodiment of the gas safety valve 1 according to the invention and a thermocouple 50 arranged in a domestic appliance to determine the temperature in an enclosure. In this embodiment, the electrical connection is also performed through a chip card 60. The thermocouple 50 is connected to a standard connector 20e of the chip card 60 by means of a standard connector 20d. The output of the chip card 60 is by means of a standard connector 20e to which a cable with a standard connector 20d at one end and a standard connector 20a at the other end is connected. This standard connector 20a is connected to a standard output connector 20 of the gas safety valve 1 of the invention.

The gas safety valve and the thermocouple are thereby electrically connected with exclusively standard connectors existing in the market. The connection is less expensive and more reliable because in addition to being performed with standard connectors out of a catalogue, and as can be seen in the embodiment shown, the number of elements used in the connection is even reduced by one cable and two connectors, one of which is a special connector. To avoid using special connectors and to enable using standard connectors, a gas safety valve 1 has been developed in which the internal tightness and the manner of performing the electrical connections with the phase and ground terminals is integrated inside the support of the gas safety valve 1, achieving more space to integrate different standard connector models with different electrical terminal shapes and sizes.

Figure 3:
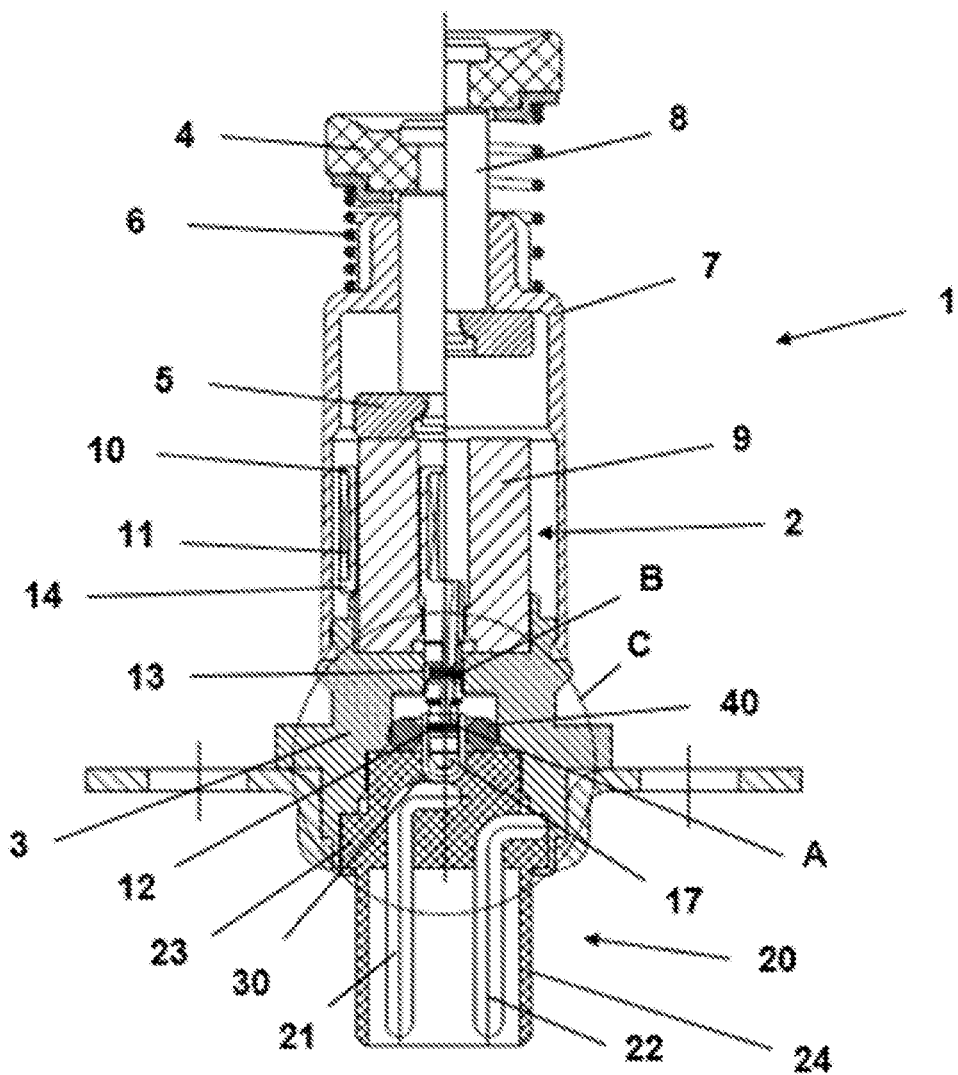
FIG. 3 shows a section view of an embodiment of a gas safety valve according to one embodiment, shown in two longitudinal halves in the two valve positions, i.e., closed and open valve positions.
Figure 4:
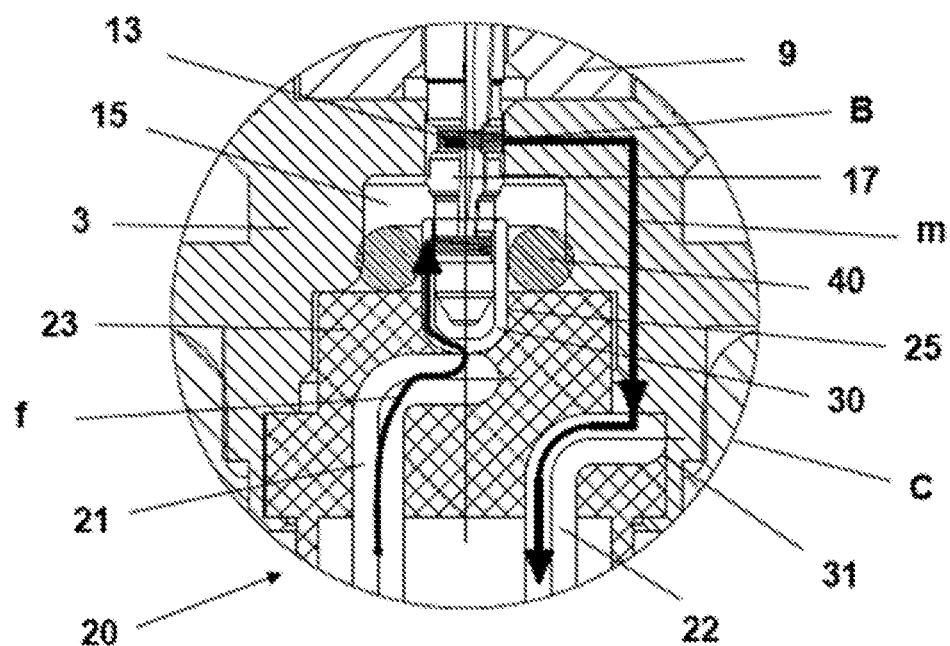
FIG. 4 shows detail C of the gas safety valve shown in FIG. 3.

FIG. 3 shows a section view of an electromagnetic gas safety valve 1 according to one embodiment, shown in two longitudinal halves in the two valve positions, i.e., closed and open valve positions, and FIG. 4 shows detail C of the gas safety valve 1 shown in FIG. 3.

The gas safety valve 1 allows or blocks the passage of gas to a burner of the domestic appliance. The gas safety valve 1 comprises an electromagnet 2 supported in a support 3 or seat, a phase closure 30, a plug 4, a mobile armature 5 coupled to the plug 4 and movable between a position corresponding to the open valve (shown on the left side of FIG. 3) and a position corresponding to the closed valve (shown on the right side of FIG. 3), and a spring 6 suitable for returning the plug 4 together with the mobile armature 5 to the closed valve position. The gas safety valve 1 further comprises a case 7 enclosing therein the electromagnet 2, the mobile armature 5 and partially the support 3.

The plug 4 is arranged coupled to the mobile armature 5 through a rod 8. The plug 4 is configured for being moved when it is pushed and for keeping the mobile armature 5 attracted to the electromagnet 2 when said electromagnet 2 is energized, opening the gas passage to a position in which the mobile armature 5 comes into contact with the electromagnet 2 (open valve position shown on the left side of FIG. 3). When the electromagnet 2 is no longer energized, the spring 6 acts on the plug 4, moving it together with the mobile armature 5 to the closed valve position (shown on the right side of FIG. 3), closing the gas passage.

The electromagnet 2 comprises a core 9 supported in the seat 3, a reel 10 which is arranged inserted in the core 9, and a winding 11 which arranged wound on the reel 10 and comprising a phase wire 12 and a ground wire 13. The core 9 has a U-shaped geometry defined by two arms attached through a base. The reel 10 is arranged inserted in one of the arms of the core 9. The core 9 and the mobile armature 5 are made of ferromagnetic materials. The support 3 is made of an electrically conductive material, preferably a metallic material, whereas the reel 10 is made of an electrically isolating material, preferably a plastic material.

The reel 10 comprises a projection 17 extending axially and comprising a first electrical contact area A in which a segment of the phase wire 12 is arranged, and a second electrical contact area B in which a segment of the ground wire 13 is arranged. Both the first electrical contact area A and the second electrical contact area B are arranged inserted and compressed, respectively, against the phase closure 30 electrically connecting the phase wire 12 with the phase closure 30, and against the support 3 electrically connecting the ground wire 13 with the support 3. Both electrical contact areas A and B exert a constant elastic force against the phase closure 30 and the support 3, respectively, which assures the electrical connection between the phase wire 12 and the phase closure 30, and between the ground wire 13 and the support 3.

The reel 10 comprises a base 14 and a hollow tubular body extending continuously and orthogonally from the base 14, and which one of the arms of the core 9 traverses. The projection 17 extends from the base 14, in the longitudinal direction of the gas safety valve 1, traversing the base of the core 9 and the support 3.

The support 3, which is a substantially cylindrical part in this embodiment, is internally hollow, comprising a housing 15. In its upper portion, where the electromagnet 2 is supported, the support 3 comprises a through opening communicated with the housing 15, the projection 17 of the reel 10 traversing said opening. A first portion of the projection 17 in which the electrical area B is located, is in electrical contact with the support 3, and a second portion of the projection 17 in which the electrical area A is located, close to the end of the projection 17, is arranged inserted in and electrical contact with in the phase closure 30, the phase closure 30 therefore being arranged in the housing 15 of the support 3.

In this embodiment, the gas safety valve 1 includes a connector 20 comprising a base 23 which is partially inserted in the housing 15 of the support 3, being inserted from the lower portion of said support 3. Said connector 20 comprises, inserted in the base 23, a first end 21a of a male phase terminal 21 and a first end 22a of a male ground terminal 22, the phase closure 30 being electrically connected with the first end 21a of the phase terminal 21, and an inner area 31 of the support 3, which is the inner face of the support 3 in the housing 15, being electrically connected with the first end 22a of the ground terminal 22. In this embodiment of the gas safety valve 1, a second end 21b of the phase terminal 21 and a second end 22b of the ground terminal 22 are in contact with the outside of said gas safety valve 1. The location of each of the second end 21b of the phase terminal 21 and the second end 22b of the ground terminal 22 can thereby be selected to form a standard connector.

To achieve the formation of any of a variety of standard connections, the separation distance of the phase terminal 21 and ground terminal 22 varies, and the inner shape of the housing 15 of the support 3 therefore varies, but the function of a connection with the external standard connector 20a is the same. Said function of the support 3 is to serve as a support for the phase terminal 21 and ground terminal 22, and for the base 23 of the connector 20, and on the other hand to allow for a space for the electrical connection of the phase closure 30 with the phase terminal 21, and the electrical connection of the inner area 31 of the support 3 with the ground terminal 22.

In this embodiment of the gas safety valve 1, the first end 21a of the phase terminal 21 and the first end 22a of the ground terminal 22 are bent at an angle, said first end of the phase terminal 21 being arranged inside the base 23 of the connector 20. The connector 20 comprises an opening 25 in the upper portion of the base 23, in communication with the first end 21a of the phase terminal 21. One end of the phase closure 30 is introduced in the opening 25 and electrically connected with the first end 21a of the phase terminal 21.

The connector 20 comprises a peripheral shoulder 24 extending axially from the base 23 to the outside of the gas safety valve 1. The phase terminal 21 and the ground terminal 22 comprise a respective straight second end 21b and 22b projecting from the base 23 of the connector 20 to the outside. The shoulder 24 of the connector 20 surrounds the second end 21b of the phase terminal 21 and the second end 22b of the ground terminal 22. This shoulder 24 aids in the connection with the outer standard connector 20a, which is a standard female connector in this embodiment of the gas safety valve 1.

In another embodiment of the gas safety valve 1 (not depicted), the phase terminal 21 and the ground terminal 22 are female, the second end 21b of the phase terminal 21 and the second end 22b of the ground terminal 22 being arranged inside the base 23, but in contact with the outside. The outer standard connector 20a in this embodiment of the gas safety valve 1 is a standard male connector.

The gas safety valve 1 comprises a sealing gasket 40, which is annular in this embodiment. The phase closure 30 is cup-shaped and acts as an intermediate phase connector, differing from the phase connector of European Publication No. EP3222914A1 in that it has a short length and does not project from the support 3 to the outside, being arranged in the housing 15. In this embodiment, said phase closure 30 is cup-shaped, with a closed end opposite the base 23 of the connector 20, and the other end being open, the projection 17 in which electrical area A is arranged being tightly introduced through said open end. This attachment enables transmitting the electrical signal f. The closed end of the phase closure 30 is introduced in the opening 25 of the base 23 of the connector 20 and is electrically connected with the first end 21a of the phase terminal 21, such that the electrical signal can be received from the outside.

In one embodiment, the electrical phase signal f reaches the outer standard connector 20a from the thermocouple 50 through the chip card 60. As shown in FIG. 4, the signal f is transmitted to the phase terminal 21, and it is transmitted from this phase terminal 21 to the phase closure 30 and then to electrical area A of the projection 17, and then to the winding 11 of the electromagnet 2. The electrical ground signal m returns from said winding 11 to the support 3 through electrical area B of the projection 17, and the signal m is transmitted from said support 3 to the ground terminal 22, and the signal m is transmitted from said ground terminal 22 to the outer standard connector 20a.

In the embodiment of the gas safety valve 1 that is shown, the first end 21a of the phase terminal 21 is welded to the phase closure 30, for example by means of a heat weld, and the first end 22a of the ground terminal 22 of the connector 20 comprises a small semi-spherical area and is directly brought into contact under pressure against the support 3. In other embodiments of the gas safety valve 1, the electrical connection between the first end 21a of the phase terminal 21 and the phase closure 30 is performed by means of direct contact by means of pressure or in an elastic manner, or by means of applying an electrically conductive adhesive. Furthermore, the electrical connection between the first end 22a of the ground terminal 22 and the inner area 31 of the support 3 is performed by means of welding, direct contact in an elastic manner, or by means of applying an electrically conductive adhesive.

The sealing gasket 40 is arranged tightened in the housing 15 of the support 3 surrounding the phase closure 30 and against the inner area 31 of the support 3, exerting an elastic force against said inner area 31 of the support 3. The gas located in the gas safety valve 1 therefore cannot come out when it is open because the gasket 40 prevents it from doing so and because the phase closure 30 is closed, tightness being maintained in the support 3.

The connector 20 is preferably made of plastic, and in the process of manufacturing the connector 20 said plastic is injection molded onto the phase terminal 21, which has previously been welded with the phase closure 30, and the ground terminal 22, forming a single part. Said part is introduced in the housing 15 of the support 3, the projection 17 being introduced in the phase closure 30.

Figure 5:
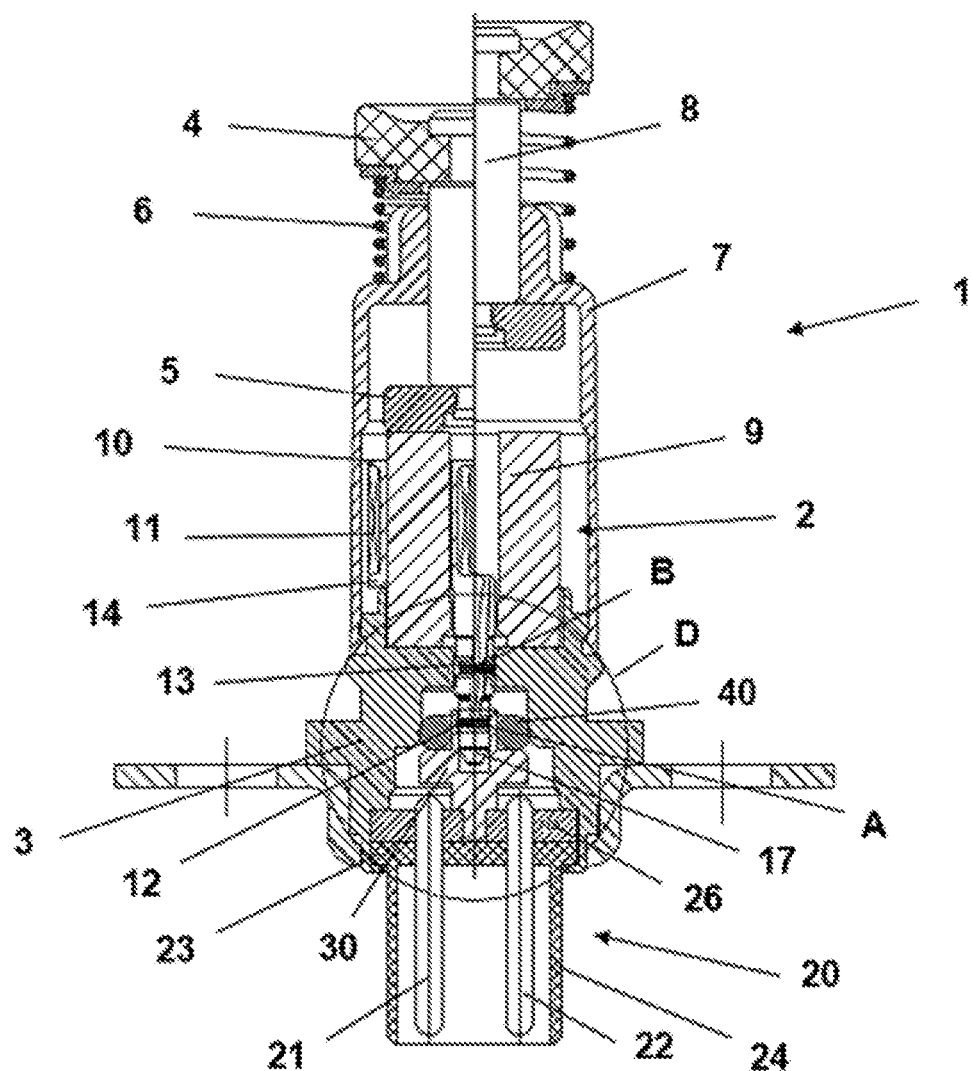
FIG. 5 shows a section view of a second embodiment of the gas safety valve, shown in two longitudinal halves in the two valve positions, i.e., closed and open valve positions.
Figure 6:
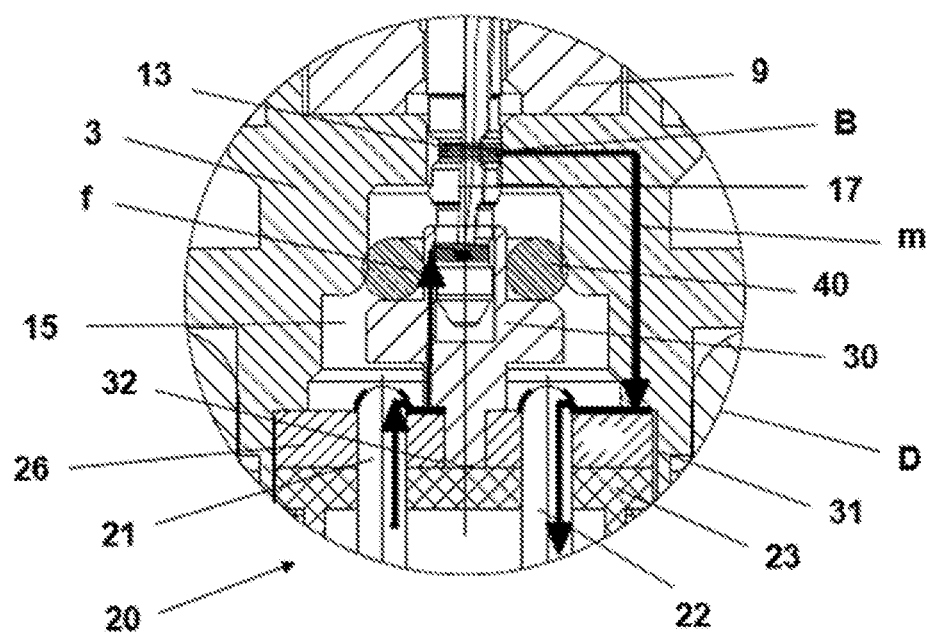
FIG. 6 shows detail D of the gas safety valve shown in FIG. 5.

FIG. 5 shows a section view of a second embodiment of the gas safety valve 1, shown in two longitudinal halves in the two valve positions, i.e., closed and open valve positions, and FIG. 6 shows detail D of the gas safety valve 1 shown in FIG. 5. This second embodiment of the gas safety valve 1 differs from the embodiment of the gas safety valve 1 previously shown in the construction of the connector 20.

The connector 20 of this second embodiment of the gas safety valve 1 also comprises a base 23 which is partially inserted in the lower portion of the housing 15 of the support 3, being inserted from the lower portion of said support 3, and also comprises a peripheral shoulder 24 extending axially from the base 23 to the outside of the gas safety valve 1. Said connector 20 comprises, inserted in the base 23, a first end 21a of a male phase terminal 21 and a first end 22a of a male ground terminal 22, the phase closure 30 being electrically connected with the first end 21a of the phase terminal 21, and an inner area 31 of the support 3 being electrically connected with the first end 22a of the ground terminal 22. In this second embodiment of the gas safety valve 1, a second end 21b of the phase terminal 21 and a second end 22b of the ground terminal 22 are in contact with the outside of said gas safety valve 1, the shoulder 24 surrounding said second ends. The second end 21b of the phase terminal 21 and the second end 22b of the ground terminal 22 can thereby also be arranged in the connector 20 to form a standard connector.

The support 3 also has the function of serving as a support for the phase terminal 21 and ground terminal 22, and for the base 23 of the connector 20, and on the other hand allowing for a space for the electrical connection of the phase closure 30 with the phase terminal 21, and the electrical connection of the inner area 31 of the support 3 with the ground terminal 22. In this second embodiment of the gas safety valve 1, the first end 21a of the phase terminal 21 and the first end 22a of the ground terminal 22 are straight and project from the base 23 of the connector 20.

In another embodiment of the gas safety valve 1 (not depicted), the phase terminal 21 and the ground terminal 22 are female, comprising a first end projecting from the base 23, and a second end inside the base 23, but in contact with the outside. The outer standard connector 20a in this embodiment of the gas safety valve 1 is a standard male connector.

The gas safety valve 1 comprises a sealing gasket 40, and the phase closure 30 is substantially cross-shaped and acts as an intermediate phase connector, differing from the phase connector of European Publication No. EP3222914A1 in that it has a short length and does not project from the support 3 to the outside, being arranged in the housing 15. The phase closure 30 comprises a closed end opposite the base 23 of the connector 20, and the other end is open, the projection 17 in which the electrical area A is arranged being tightly introduced through said open end. The cross-shaped arms of the phase closure 30 allow for the support of the sealing gasket 40. The sealing gasket 40 is arranged surrounding the phase closure 30 and against the inner area 31 of the support 3, exerting an elastic force against said inner area 31 of the support 3 to provide a leak tight seal to prevent a passage of gas to the outside of the safety gas.

Figure 7:
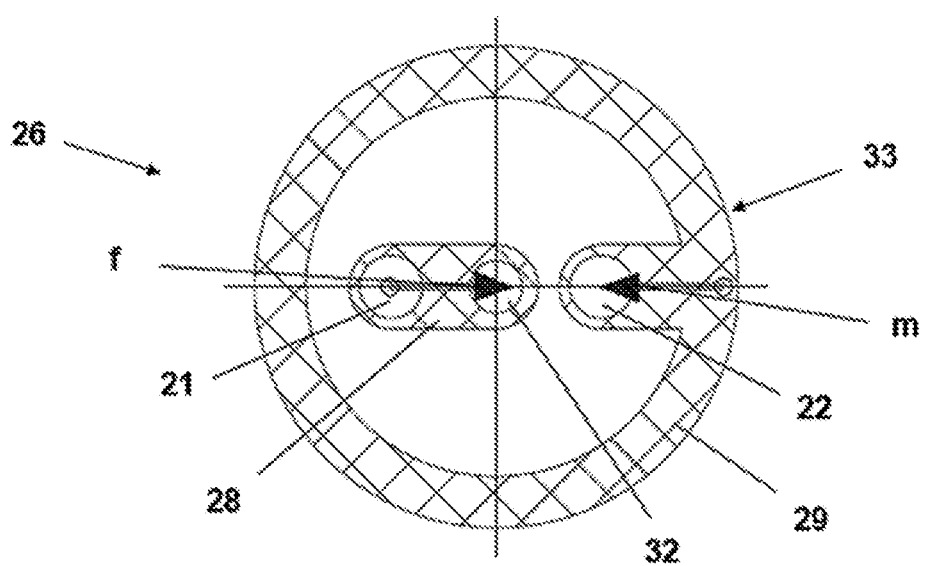
FIG. 7 shows a plan view of the printed circuit board of the gas safety valve of FIG. 5.

In this second embodiment, the gas safety valve 1 comprises a printed circuit board 26 comprising a printed circuit 33, as shown in the plan view of FIG. 7, and is fixed to the upper portion of the base 23 of the connector 20, the printed circuit 33 being opposite the phase closure 30. The first end 21a of the phase terminal 21 and the first end 22a of the ground terminal 22, projecting from the base 23, are inserted in the printed circuit board 26 and are in electrical contact with the printed circuit 33. The first end 21a of the phase terminal 21 is electrically connected with the phase closure 30 and the first end 22a of the ground terminal 22 is electrically connected with the inner area 31 of the support 3 through the printed circuit 33 of the printed circuit board 26.

In this embodiment, the printed circuit board 26 comprises an opening 32 opposite the phase closure 30, the closed end of the phase closure 30 being introduced in the opening 32. The attachment of the phase closure 30 with the printed circuit board 26, and therefore with the connector 20, is thereby secured and the electrical connection improved. The printed circuit 33 comprises an electrical phase bus 28 and an electrical ground bus 29, the first end 21a of the phase terminal 21 being electrically connected with the electrical phase bus 28 by means of welding, and the phase closure 30 being electrically connected with the electrical bus 28 by means of welding. Likewise, the first end 22a of the ground terminal 22 is electrically connected with the electrical ground bus 29 by means of welding, and the inner area 31 of the support 3 is electrically connected with the electrical ground bus 29 by means of welding.

In other embodiments of the gas safety valve 1 comprising the printed circuit board 26, the electrical connection between the phase closure 30 and the printed circuit board 26 is performed by means of direct contact by means of pressure or in an elastic manner, or by means of applying an electrically conductive adhesive. Furthermore, the electrical connection between the inner area 31 of the support 3 and the printed circuit board 26 is performed by means of direct contact by means of pressure or in an elastic manner, or by means of applying an electrically conductive adhesive.

In one embodiment, the electrical phase signal f reaches the outer standard connector 20a from the thermocouple 50 through the chip card 60. As shown in FIG. 6, the signal f is transmitted to the phase terminal 21, and it is transmitted from this phase terminal 21 through the electrical phase bus 28 to the phase closure 30, and then to electrical area A of the projection 17, and finally to the winding 11 of the electromagnet 2. The electrical ground signal m returns from said winding 11 to the support 3 through electrical area B of the projection 17, and the signal m is transmitted from said support 3 through the electrical bus 29 of the printed circuit board 26 to the ground terminal 22, and the signal m is transmitted from said ground terminal 22 to the outer standard connector 20a.

In this embodiment, the connector 20 is made of injected plastic. The phase terminal 21 and ground terminal 22 are inserted in said connector 20, and then the formed part is assembled with the printed circuit board 26 in which the first end 21a of the phase terminal 21 and the first end 22a of the ground terminal 22 are welded together. In another embodiment of the gas safety valve 1, the plastic of the connector 20 is injection molded onto the phase terminal 21 and the ground terminal 22, forming a single part, after which the printed circuit board is assembled in said part.

The following clauses disclose in an unlimited way additional implementations, with each clause representing an implementation.

Clause 1. A gas safety valve adapted to a domestic appliance, comprising an electromagnet (2) comprising a core (9), a reel (10) inserted in the core (9), the reel (10) comprising a projection (17) extending axially and comprising a first electrical contact area (A), and a second electrical contact area (B), and a winding (11) supported on the reel (10), the winding (11) comprising a phase wire (12) and a ground wire (13), a segment of the phase wire (12) being arranged in the first electrical contact area (A), and a segment of the ground wire (13) being arranged in the second electrical contact area (B), a support (3) of the electromagnet (2) being electrically conductive, and a phase closure (30), wherein the first electrical contact area (A) is arranged inserted in the phase closure (30) and the second electrical contact area (B) is arranged inserted in the support (3), both electrical contact areas (A, B) exerting an elastic force against the phase closure (30) and the support (3), respectively, which assures the electrical connection between the phase wire (12) and the phase closure (30), and between the ground wire (13) and the support (3), respectively, the support (3) comprising a housing (15) in which the phase closure (30) is arranged, the gas valve including a connector (20) comprising a base (23) at least partially inserted in the housing (15) of the support (3), said connector (20) comprising, inserted in the base (23), a first end of a phase terminal (21) and a first end of a ground terminal (22), the phase closure (30) being electrically connected with the first end of the phase terminal (21), an inner area (31) of the support (3) being electrically connected with the first end of the ground terminal (22), and a second end of the phase terminal (21) and a second end of the ground terminal (22) being in contact with the outside of the gas safety valve (1), wherein the second end of the phase terminal (21) and the second end of the ground terminal (22) can form a standard connector.

Clause 2. Gas safety valve according to clause 1, wherein the phase terminal (21) and the ground terminal (22) are male, the second end of the phase terminal (21) and the second end of the ground terminal (22) projecting from the base (23).

Clause 3. Gas safety valve according to clause 1, wherein the phase terminal (21) and the ground terminal (22) are female, the second end of the phase terminal (21) and the second end of the ground terminal (22) being arranged inside the base (23).

Clause 4. Gas safety valve according to any of clauses 1 to 3, wherein the connector (20) comprises a peripheral shoulder (24) extending axially from the base (23) to the outside of the gas safety valve (1), said shoulder (24) surrounding the phase terminal (21) and the ground terminal (22).

Clause 5. Gas safety valve according to any of clauses 1 to 4, comprising a gasket (40) arranged in the housing (15) of the support (3) surrounding the phase closure (30), said gasket (40) exerting an elastic force against the inner area (31) of the support (3), the gasket (40) and the phase closure (30) forming a leak-tight closure preventing the passage of gas.

Clause 6. Gas safety valve according to any of clauses 1 to 5, wherein the first end of the phase terminal (21) is arranged inside the base (23) of the connector (20), the connector (20) comprising an opening (25) in communication with the first end of the phase terminal (21), one end of the phase closure (30) being introduced in the opening (30) and electrically connected with the first end of the phase terminal (21).

Clause 7. Gas safety valve according to any of clauses 1 to 6, wherein the phase closure (30) is electrically connected with the first end of the phase terminal (21) and the inner area (31) of the support (3) is electrically connected with the first end of the ground terminal (22), respectively, coming into contact directly or by means of an electrically conductive adhesive.

Clause 8. Gas safety valve according to any of clauses 1 to 6, wherein the first end of the phase terminal (21) and the first end of the ground terminal (22) of the connector (20) are welded to the phase closure (30) and to the support (3), respectively.

Clause 9. Gas safety valve according to any of clauses 1 to 5, comprising a printed circuit board (26) which is fixed to the base (23) of the connector (20), the first end of the phase terminal (21) and the first end of the ground terminal (22) being in contact with the printed circuit board (26), and the first end of the phase terminal (21) being electrically connected with the phase closure (30), and the first end of the ground terminal (22) being electrically connected with the inner area (31) of the support (3) through the printed circuit board (26).

Clause 10. Gas safety valve according to clause 9, wherein the printed circuit board (26) comprises an opening (32) opposite the phase closure (30), one end of the phase closure (30) being introduced in the opening (32).

Clause 11. Gas safety valve according to clause 9 or 10, wherein the phase terminal (21) and the ground terminal (22) of the connector (20) are welded to the printed circuit board (26).

Clause 12. Gas safety valve according to any of clauses 9 to 11, wherein the first end of the phase terminal (21) is electrically connected with an electrical phase bus (28) of the printed circuit board (26), and the phase closure (30) is electrically connected with the first end of the phase terminal (21), coming into contact with the electrical phase bus (28) directly or by means of an electrically conductive adhesive.

Clause 13. Gas safety valve according to any of clauses 9 to 12, wherein the first end of the ground terminal (22) is in electrical contact with an electrical ground bus (29) of the printed circuit board (26), and the inner area (31) of the support (3) is electrically connected with the first end of the ground terminal (22) coming into contact with the electrical ground bus (29) directly or by means of an electrically conductive adhesive.

Clause 14. Gas safety valve according to any of clauses 9 to 12, wherein the phase closure (30) and the inner area (31) of the support (3) are welded to the printed circuit board (26).

Clause 15. Gas safety valve according to any of clauses 1 to 14, wherein the connector (20) is made of plastic, the plastic of the connector (20) being injection molded onto the phase terminal (21) and the ground terminal (22), or the phase terminal (21) and the ground terminal (22) being inserted in the connector (20) made of plastic.

What is claimed is:

1. A gas safety valve comprising:
an electromagnet that includes:
a core;
a reel having a first portion inserted in the core, the reel including a projection that extends axially from the first portion;
a winding supported on the reel, the winding including a phase wire and a ground wire, a segment of the phase wire being arranged on the projection at a first axial location to form a first electrical contact area and a segment of the ground wire being arranged on the projection at a second axial position different from the first axial position to form a second electrical contact area;
a phase closure including a cavity in which the first electrical contact area is arranged inserted, the first electrical contact area configured such that the phase wire is elastically forced against an inner wall of the cavity;
an electrically conductive support on which at least a portion of the electromagnet is supported, the electrically conductive support including a housing in which at least a portion of the phase closure resides, the second electrical contact area being arranged inside an opening of the support such that the ground wire is elastically forced against an inner wall of the opening;
a connector having a base that at least partially resides in the housing of the support, the connector including a phase terminal and a ground terminal that each pass through the base, the phase terminal having a first end portion that is electrically connected with the phase closure, the ground terminal having a first end portion electrically connected to the electrically conductive support, each of the phase terminal and ground terminal having a second end portion arranged with respect to one another to form an electrical connector that is connectable to an external electrical connector.

2. The gas safety valve according to claim 1 wherein the first end portion of each of the phase terminal and ground terminal reside inside the base of the connector.

3. The gas safety valve according to claim 1, wherein the electrically conductive support comprises an internal sidewall, the first end portion of the ground terminal being electrically connected to the internal sidewall.

4. The gas safety valve according to claim 1, wherein the second portion of each of the phase terminal and ground terminal are male terminals that project from the base of the connector.

5. The gas safety valve according to claim 1, wherein the second end portion of each of the phase terminal and ground terminal are female terminals arranged inside the base of the connector.

6. The gas safety valve according to claim 1, wherein the connector comprises a peripheral shoulder extending axially from the base to an outside of the gas safety valve, the shoulder surrounding the second end portion of each of the phase terminal and ground terminal.

7. The gas safety valve according to claim 1, further comprising a gasket arranged in the housing of the electrically conductive support surrounding the phase closure, the gasket exerting an elastic force against an internal sidewall of the electrically conductive support, the gasket and the phase closure forming a leak-tight closure preventing the passage of gas.

8. The gas safety valve according to claim 1, wherein the first end portion of the phase terminal resides inside the base of the connector, the connector including an opening in communication with the first end portion of the phase terminal, the phase closure having an end located inside the opening of the connector and electrically connected with the first end portion of the phase terminal.

9. The gas safety valve according to claim 3, wherein the phase closure is electrically connected with the first end portion of the phase terminal by an electrically conductive adhesive, and the electrically conductive support is electrically connected with the first end portion of the ground terminal by the electrically conductive adhesive.

10. The gas safety valve according to claim 1, wherein the first end portion of the phase terminal and the first end portion of the ground terminal of the connector are respectively welded to the phase closure and to the electrically conductive support.

11. A gas safety valve comprising:
an electromagnet that includes:
a core;
a reel having a first portion inserted in the core, the reel including a projection that extends axially from the first portion;
a winding supported on the reel, the winding including a phase wire and a ground wire, a segment of the phase wire being arranged on the projection at a first axial location to form a first electrical contact area and a segment of the ground wire being arranged on the projection at a second axial position different from the first axial position to form a second electrical contact area;
a phase closure including a cavity in which the first electrical contact area is arranged inserted, the first electrical contact area configured such that the phase wire is elastically forced against an inner wall of the cavity;
an electrically conductive support on which at least a portion of the electromagnet is supported, the electrically conductive support including a housing in which at least a portion of the phase closure resides, the second electrical contact area being arranged inside an opening of the support such that the ground wire is elastically forced against an inner wall of the opening;
a connector having base, a phase terminal and a ground terminal, the phase terminal and ground terminal passing through the base, the phase terminal having a first end portion that is electrically connected with the phase closure, the ground terminal having a first end portion electrically connected with the electrically conductive support, each of the phase terminal and ground terminal having a second end portion arranged with respect to one another to form an electrical connector that is connectable to an external electrical connector; and
a printed circuit board fixed to the base of the connector, the first end portion of the phase terminal and the first end portion of the ground terminal being in contact with the printed circuit board, and the first end portions of the phase terminal and the ground terminal being respectively electrically connected with the phase closure (and the electrically conductive support through the printed circuit board.

12. The gas safety valve according to claim 11, wherein the electrically conductive support comprises an internal sidewall, the first end portion of the ground terminal being electrically connected with the internal sidewall through the printed circuit board.

13. The gas safety valve according to claim 11, wherein the printed circuit board includes an opening with a part of the phase closure residing inside the opening.

14. The gas safety valve according to claim 11, wherein the phase terminal and the ground terminal of the connector are welded to the printed circuit board.

15. The gas safety valve according to claim 11, wherein the printed circuit board includes a phase bus that is electrically connected with each of the phase closure and first end portion of the phase terminal.

16. The gas safety valve according to claim 15, wherein the printed circuit board includes an electrical ground bus that is electrically connected with each of the electrically conductive support and first end portion of the ground terminal.

17. The gas safety valve according to claim 16, wherein the phase closure and the electrically conductive the support are welded to the printed circuit board.

18. The gas safety valve according to claim 16, wherein the ground bus of the printed circuit board is in electrical contact with an internal sidewall of the electrically conductive support.

19. The gas safety valve according to claim 11, further comprising a gasket arranged in the housing of the electrically conductive support surrounding the phase closure, the gasket exerting an elastic force against an internal sidewall of the electrically conductive support, the gasket and the phase closure forming a leak-tight closure preventing the passage of gas.

20. The gas safety valve according to claim 11, wherein the connector is made of a plastic, the plastic being injection molded onto the phase terminal and the ground terminal.

21. The gas safety valve according to claim 11, wherein the connector comprises a peripheral shoulder extending axially from the base to an outside of the gas safety valve, the shoulder surrounding the second end portion of each of the phase terminal and ground terminal.

\* \* \* \* \*